(12) United States Patent
Masters et al.

(10) Patent No.: US 8,176,164 B1
(45) Date of Patent: May 8, 2012

(54) METHOD AND SYSTEM FOR MANAGING NETWORK TRAFFIC

(75) Inventors: Richard Roderick Masters, Seattle, WA (US); David A. Hansen, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 13/300,398

(22) Filed: Nov. 18, 2011

Related U.S. Application Data

(60) Continuation of application No. 12/837,420, filed on Jul. 15, 2010, which is a division of application No. 10/385,790, filed on Mar. 10, 2003, now Pat. No. 7,774,484.

(60) Provisional application No. 60/435,550, filed on Dec. 19, 2002.

(51) Int. Cl.
*G06F 15/173* (2006.01)
(52) U.S. Cl. .................. 709/223; 709/203; 709/229
(58) Field of Classification Search .................. 709/223, 709/224, 203, 217, 219, 225, 229
See application file for complete search history.

(56) References Cited

U.S. PATENT DOCUMENTS

| | | | |
|---|---|---|---|
| 5,553,242 A | 9/1996 | Russell et al. |
| 5,835,724 A | 11/1998 | Smith |
| 5,941,988 A | 8/1999 | Bhagwat et al. |
| 6,182,122 B1 | 1/2001 | Berstis |
| 6,226,684 B1 | 5/2001 | Sung et al. |
| 6,253,226 B1 | 6/2001 | Chidambaran et al. |
| 6,298,380 B1 | 10/2001 | Coile et al. |
| 6,304,908 B1 | 10/2001 | Kalajan |
| 6,370,584 B1 | 4/2002 | Bestavros et al. |
| 6,381,638 B1 | 4/2002 | Mahler et al. |
| 6,411,986 B1 | 6/2002 | Susai et al. |
| 6,650,640 B1 | 11/2003 | Muller et al. |
| 6,654,701 B2 | 11/2003 | Hatley |
| 6,697,363 B1 | 2/2004 | Carr |
| 6,754,662 B1 | 6/2004 | Li |
| 6,766,373 B1 | 7/2004 | Beadle et al. |
| 6,829,238 B2 | 12/2004 | Tokuyo et al. |
| 6,928,082 B2 | 8/2005 | Liu et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,963,982 B1 | 11/2005 | Brustoloni et al. |
| 6,978,334 B2 | 12/2005 | Hiratsuka |
| 7,103,045 B2 | 9/2006 | Lavigne et al. |

(Continued)

OTHER PUBLICATIONS

"BIG-IP® Controller With Exclusive OneConnect™ Content Switching Feature Provides a Breakthrough System for Maximizing Server ad Network Preformance" F5 Networks, Inc., Press Release, May 8, 2001, 3 pages.

(Continued)

*Primary Examiner* — LaShonda Jacobs
(74) *Attorney, Agent, or Firm* — Frommer Lawrence & Haug LLP; Jamie L. Wiegand

(57) ABSTRACT

A system and method for directing network connections. The invention enables a network device to direct subsequent connections from a client to a server for accessing resources. A process extracts a persistence key from a received message, and employs the persistence key to identify the appropriate server. An interface is provided, enabling a user program to direct the process of extracting the persistence key. The invention also provides a way for multiple clients to persist to a common server.

20 Claims, 8 Drawing Sheets

U.S. PATENT DOCUMENTS

| | | | |
|---|---|---|---|
| 7,136,385 | B2 | 11/2006 | Damon et al. |
| 7,139,792 | B1 | 11/2006 | Mishra et al. |
| 7,146,417 | B1 | 12/2006 | Coile et al. |
| 7,161,947 | B1 | 1/2007 | Desai |
| 7,215,637 | B1 | 5/2007 | Ferguson et al. |
| 7,254,639 | B1 | 8/2007 | Siegel et al. |
| 7,277,924 | B1 | 10/2007 | Wichmann et al. |
| 7,321,926 | B1 | 1/2008 | Zhang et al. |
| 7,366,781 | B2 * | 4/2008 | Abjanic ......................... 709/227 |
| 7,376,731 | B2 * | 5/2008 | Khan et al. .................... 709/224 |
| 7,657,618 | B1 * | 2/2010 | Rothstein et al. ............. 709/223 |
| 7,720,980 | B1 * | 5/2010 | Hankins et al. ............... 709/229 |
| 7,774,484 | B1 * | 8/2010 | Masters et al. ................ 709/229 |
| 2001/0023442 | A1 | 9/2001 | Masters |
| 2002/0025036 | A1 | 2/2002 | Sato |
| 2002/0055980 | A1 | 5/2002 | Goddard |
| 2002/0055983 | A1 | 5/2002 | Goddard |
| 2002/0059428 | A1 | 5/2002 | Susai et al. |
| 2002/0078174 | A1 | 6/2002 | Sim et al. |
| 2002/0105931 | A1 | 8/2002 | Heinonen et al. |
| 2002/0120743 | A1 | 8/2002 | Shabtay et al. |
| 2002/0138739 | A1 * | 9/2002 | Scheetz et al. ................ 713/185 |
| 2003/0091025 | A1 | 5/2003 | Celi et al. |
| 2003/0145077 | A1 * | 7/2003 | Khan et al. .................... 709/224 |
| 2003/0208600 | A1 | 11/2003 | Cousins |
| 2004/0205597 | A1 * | 10/2004 | Abjanic ......................... 715/513 |
| 2004/0225810 | A1 | 11/2004 | Hiratsuka |
| 2005/0138243 | A1 * | 6/2005 | Tierney et al. .................. 710/52 |
| 2010/0121953 | A1 * | 5/2010 | Friedman et al. ............. 709/224 |

OTHER PUBLICATIONS

Fielding, R. et al., "Hypertext Transfer Protocol—HTTP/1.1" Network Working Group, RFC 2068, Jan. 1997, 152 pages.

Fielding, R. et al. "Hypertext Transfer Protocol—HTTP/1.1" Network Working Group, RFC 2616, Jun. 1999, 165 pages.

Hochmuth, Phil, "F5, CacheFlow Pump Up Content-Delivery Lines", NetworkWorld, May 4, 2001, 3 pages http//www.network.com/news/2001/0507cachingonline.html accessed Jun. 1, 2005.

Hewitt, John R. et al., "Securities Practice and Electronic Technology," Corporate Securities Series (New York: Law Journal Seminars-Press) 1998, title page, bibliography page, pp. 4.29-4.30.

Acharya et al., "Scalable Web Request Routing with MPLS", IBM Research Report, IBM Research Division, Dec. 5, 2001.

Reardon, Marguerite, "A Smarter Session Switch: Arrowpoint's CS Session Switches Boast The Brains Needed for E-Commerce," Data Communications, Jan. 1999, title page, pp. 3, 5, 18.

Snoeren, A.C., et al. Fine-Grained Failover Using Connection Migration, in Third Annual USENIX Symposium on Internet Technologies and Systems, 2001 http://walfredo.dsc.ufcg.edu.br/cursos/apdist20011/Snoeren01.pdf on Jun. 18, 2010.

Mogul, Jeffrey C. "The case for persistent-connection HTTP", Proceedings of the conference on Applications, technologies, architectures, and protocols for computer communication, p. 299-313, Aug. 28-Sep. 1, 1995, Cambridge, Massachusetts, United States.

Yeom, H. Y. et al., "IP Multiplexing by Transparent Port-Address Translator," Proceedings of the Tenth USENIX System Administration Conference, Chicago, IL, USA, 1996, pp. 1-16.

Official Communication for U.S. Appl. No. 10/172,411 mailed Dec. 16, 2005.
Official Communication for U.S. Appl. No. 10/172,411 mailed Jun. 19, 2006.
Official Communication for U.S. Appl. No. 10/172,411 mailed Sep. 1, 2006.
Official Communication for U.S. Appl. No. 10/172,411 mailed Nov. 13, 2006.
Official Communication for U.S. Appl. No. 10/172,411 mailed Apr. 30, 2007.
Official Communication for U.S. Appl. No. 10/172,411 mailed Oct. 18, 2007.
Official Communication for U.S. Appl. No. 10/172,411 mailed Apr. 25, 2008.
Official Communication for U.S. Appl. No. 10/172,411 mailed Oct. 1, 2008.
Official Communication for U.S. Appl. No. 10/385,790 mailed Apr. 8, 2008.
Official Communication for U.S. Appl. No. 10/385,790 mailed Sep. 2, 2008.
Official Communication for U.S. Appl. No. 10/385,790 mailed Mar. 4, 2009.
Official Communication for U.S. Appl. No. 10/385,790 mailed Sep. 10, 2009.
Official Communication for U.S. Appl. No. 10/385,790 mailed Apr. 2, 2010.
Official Communication for U.S. Appl. No. 10/409,951 mailed Jun. 16, 2006.
Official Communication for U.S. Appl. No. 10/409,951 mailed Nov. 30, 2006.
Official Communication for U.S. Appl. No. 10/409,951 mailed Mar. 8, 2007.
Official Communication for U.S. Appl. No. 10/409,951 mailed Aug. 24, 2007.
Official Communication for U.S. Appl. No. 10/409,951 mailed Jan. 4, 2008.
Official Communication for U.S. Appl. No. 10/409,951 mailed Jul. 17, 2008.
Official Communication for U.S. Appl. No. 10/409,951 mailed Dec. 24, 2008.
Official Communication for U.S. Appl. No. 10/409,951 mailed Jun. 10, 2009.
Official Communication for U.S. Appl. No. 10/409,951 mailed Dec. 24, 2009.
Official Communication for U.S. Appl. No. 10/409,951 mailed Jun. 22, 2010.
Official Communication for U.S. Appl. No. 10/409,951 mailed Jan. 19, 2011.
Official Communication for U.S. Appl. No. 10/327,742 mailed Aug. 4, 2010.
Official Communication for U.S. Appl. No. 10/327,742 mailed Jan. 5, 2011.
Official Communication for U.S. Appl. No. 10/327,742 mailed Mar. 2, 2011.
Official Communication for U.S. Appl. No. 10/327,742 mailed Aug. 18, 2011.

* cited by examiner

FIG. 4A.1

```
pool stream_example_pool1 {
    lb_method observed
    persist findstring (http_content, "date=", 5, 6)
}
pool stream_example_pool2 { lb_method observed
    persist (client_addr + client_port)
}
rule stream_example_rule {
    if (http_content contains "date=" {
        use pool stream_example_pool1
    }
    else if (http_content_collected < 20) {
        accumulate
    }
    else {
        use pool stream_example_pool2
    }
}
```

FIG. 4A.2

```
pool stream_example_pool {
    lb_method observed
    if (http_content contains "date=" {
        persist findstring (http_content, "date=", 5, 6)
    }
    else if (http_content_collected < 20) {
        accumulate
    }
    else {
        persist (client_addr + client_port)
    }
}
```

FIG. 4B
```
pool stream_example_pool {
      lb_method observed
      persist http_cookie ("user-name")
      persist_timeout 10
      member 172.16.0.150:554
      member 172.16.10.150:554
}
```

FIG. 4C
```
pool stream_example_pool {
   lb_method observed
   if (tcp_content contains "XYZ=" {
      persist findstring (tcp_content, "XYZ=", 5, 6)
   }
   else if (tcp_content_collected < 20) {
      accumulate
   }
   else {
      persist (client_addr + client_port)
   }
}
```

FIG. 4D
```
pool stream_example_pool {
      lb_method observed
      persist (client_addr + client_port + http_cookie ("user-name"))
      persist_timeout 10
      member 172.16.0.150:554
      member 172.16.10.150:554
}
```

FIG. 4E
```
findstr(http_uri, 'server=', 7, 6)    // return the 6 characters after server=
```

METHOD AND SYSTEM FOR MANAGING NETWORK TRAFFIC

RELATED APPLICATION

This application is a Continuation of U.S. patent application Ser. No. 12/837,420 entitled "Method And System For Managing Network Traffic," filed on Jul. 15, 2010, which in turn is a Divisional of U.S. patent application Ser. No. 10/385,790, now U.S. Pat. No. 7,774,484, entitled "Method And System For Managing Network Traffic," filed on Mar. 10, 2003, the benefit of which are claimed under 35 U.S.C. §120, and further of a U.S. Provisional Patent Application, Ser. No. 60/435,550, filed on Dec. 19, 2002, the benefit of which is claimed under 35 U.S.C. §119(e), and which are each incorporated herein by reference.

FIELD OF THE INVENTION

This application relates generally to managing traffic across a computer network, and, more specifically, to techniques for distributing client requests among servers on a network.

BACKGROUND

The Hyper Text Transfer Protocol (HTTP) is an application level protocol for transferring resources across the Internet, e.g., a network data object or server, where the resource is specified by a Uniform Resource Locator (URL). The Hyper Text Mark-up Language (HTML) is a simple data format that is used to create hypertext documents that are supported by the HTTP protocol. The HTTP protocol is described in "Hypertext Transport Protocol (HTTP) version 1.1, RFC 2616 (June 1999)," available through the Internet Engineering Task Force's (IETF's) website. These standards are commonly relied upon in technology of the World Wide Web (WWW) on the Internet. Other application level Internet protocols include File Transfer Protocol (FTP), Simple Mail Transfer Protocol (SMTP), Lightweight Directory Access Protocol (LDAP), TELNET, Internet Relay Chat (IRC), Internet Message Access Protocol (IMAP), Post Office Protocol (POP), and streaming media.

A traffic manager is a network device that manages network traffic. Some traffic managers manage the flow of network traffic between network devices. Some traffic managers control the flow of data packets to and from an array of application servers. A traffic manager can manage and distributes Internet, intranet or other user requests across redundant arrays of network servers, regardless of the platform type. Traffic managers can support a wide variety of network applications such as web browsing, e-mail, telephony, streaming multimedia and other network protocol traffic. The BIG-IP® family of traffic managers, by F5 Networks of Seattle, Wash., are examples of traffic managers.

BRIEF DESCRIPTION OF THE DRAWINGS

FIGS. 4A-E illustrate segments of a user program in an exemplary embodiment of the invention;

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments can be utilized, and other changes can be made, without departing from the spirit or scope of the present invention. The following detailed description is, therefore, not to be taken in a limiting sense, and the scope of the present invention is defined by the appended claims.

Throughout the specification and claims, the following terms take the meanings explicitly associated herein, unless the context clearly dictates otherwise.

The phrase "in one embodiment" as used herein does not necessarily refer to the same embodiment, though it may.

As used herein, the term "or" is an inclusive "or" operator, and is equivalent to the term "and/or", unless the context clearly dictates otherwise.

The term "packet" refers to an arbitrary or selectable amount of data that may be represented by a sequence of one or more bits, and is transferred between devices across a network.

Generally, the phrase "computer-readable media" includes any media that can be accessed by a computing device. Computer-readable media may include computer storage media, communication media, or any combination thereof.

The phrase "communication media" typically embodies computer-readable instructions, data structures, program modules, or other data in a modulated data signal such as a carrier wave or other transport mechanism and includes any information delivery media. By way of example, communication media includes wired media such as twisted pair, coaxial cable, fiber optics, wave guides, and other wired media and wireless media such as acoustic, RF, infrared, and other wireless media.

The term "modulated data signal" means a signal that has one or more of its characteristics set or changed in such a manner as to encode information in the signal.

The term "based on" is not exclusive and allows for being based on additional factors not described, unless the context clearly dictates otherwise.

Figure 1:
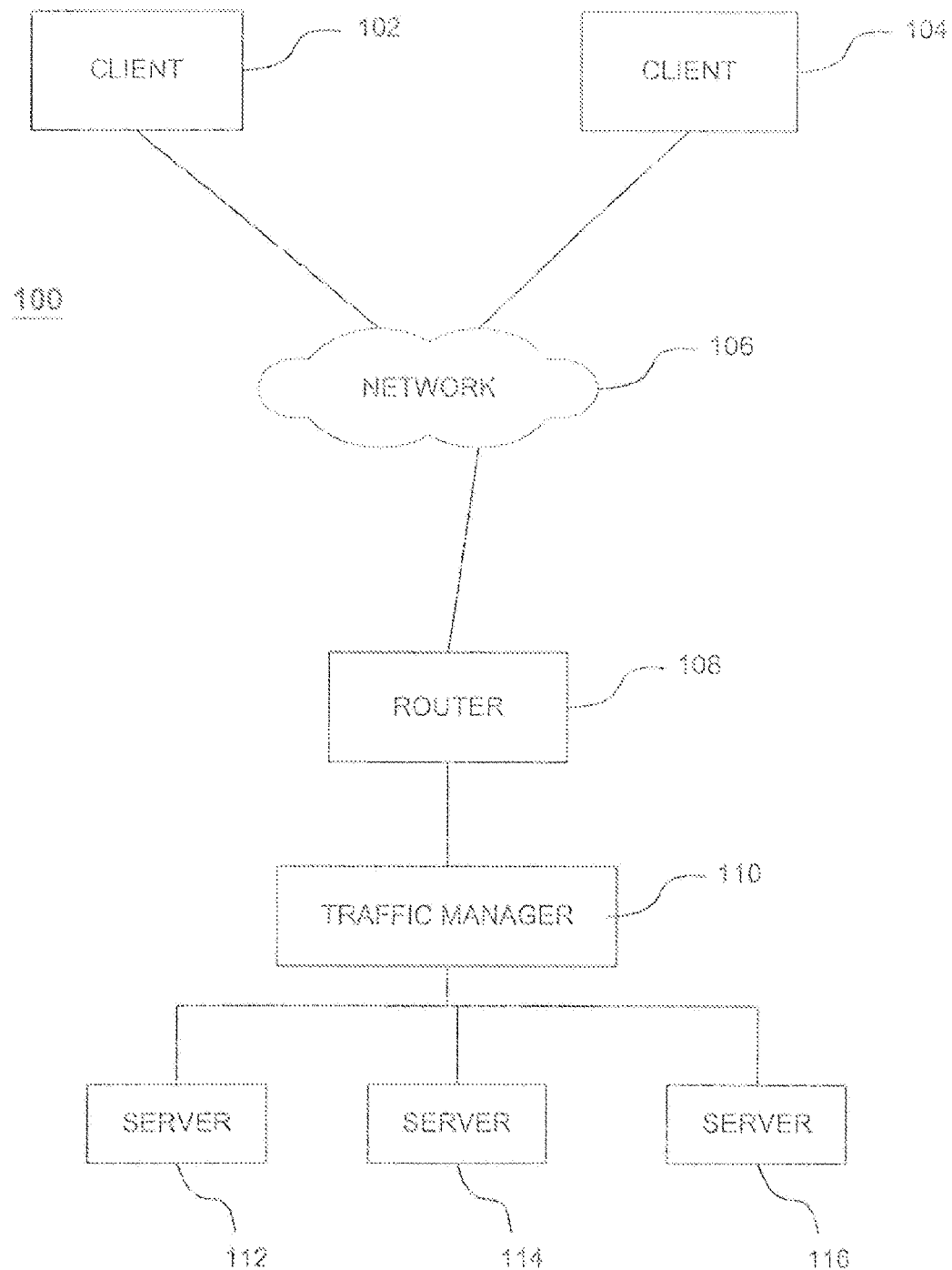
FIG. 1 is a system diagram of a computer network in which the invention may be practiced.

FIG. 1 illustrates an exemplary environment 100 in which one embodiment of the invention operates. The environment 100 includes a network 106. The network 106 can be a wide area network (WAN), a local area network (LAN), or a combination of interconnected WANs and LANs. The Internet is made up of a vast number of such interconnected networks, computers, and network devices that use the Transmission Control Protocol/Internet Protocol ("TCP/IP") suite of protocols to communicate with one another. The environment further includes client devices 102-104 (also referred to as clients), router 108, traffic manager 110, and a server array. The server array includes servers 112-116. Network 106 couples clients 102-104 to the traffic manager 110 through the router 108. Traffic manager 110 couples the server array to network 106 through the router 108. An exemplary traffic manager that can connect with network 106 is network device 200 of FIG. 2. A router 108 is an intermediary device on a communications network that expedites packet delivery.

Clients 102-104 are computing devices capable of connecting with network 106.

The set of such devices can include devices that connect using one or more wired communications mediums, a wireless communications medium, or a combination of wired and wireless communications mediums. Clients 102-104 include such devices as personal computers, multiprocessor systems, microprocessor-based or programmable consumer electronics, network PCs, cell phones, smart phones, pagers, PDAs, Pocket PCs, wearable computers, walkie talkies, radio frequency (RF) devices, infrared (IR) devices, CBs, integrated devices combining one or more of the preceding devices, and the like.

Servers 112-116 are computing devices that provide information and/or services to clients 102-104. Servers 112-116 can, for example, store web pages or components thereof, dynamically create web pages or components thereof, store data and/or files for access by other servers or clients, provide services to clients or other network devices, or any combination of these functions.

In one embodiment, clients 102-104 are sites where a human user operates the computing device to make requests for data or services from other computers on the network. Often, the requested data resides in computing devices such as servers 112-116. In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa. In one embodiment, clients 102-104 are computing devices that are not operated by a human user.

In one embodiment, traffic manager 110 manages traffic to an array of traffic managers, each of the array of traffic manager managing traffic to servers or other network devices. In this embodiment, each of the array of traffic managers can be considered a target for packets arriving at the traffic manager 110 from clients 102-104.

Traffic manager 110 receives packets from network 106, through the router 108, and also receives packets from the servers 112-116. In some operations, traffic manager 110 acts like a layer 7 switch. That is, it may look at content associated with higher layers of the packet, e.g. a request for an HTML page, the request including a Uniform Resource Locator (URL) and information that identifies the user, such as a cookie, etc. It can store information in memory so that the next time the requestor requests more information from the same web site each request is sent to the same server. A traffic manager 110 can do this, in part, to ensure that the user is connected to the server that the user previously connected to. This helps prevent the loss of transaction data, such as items in an electronic shopping cart.

Figure 2:
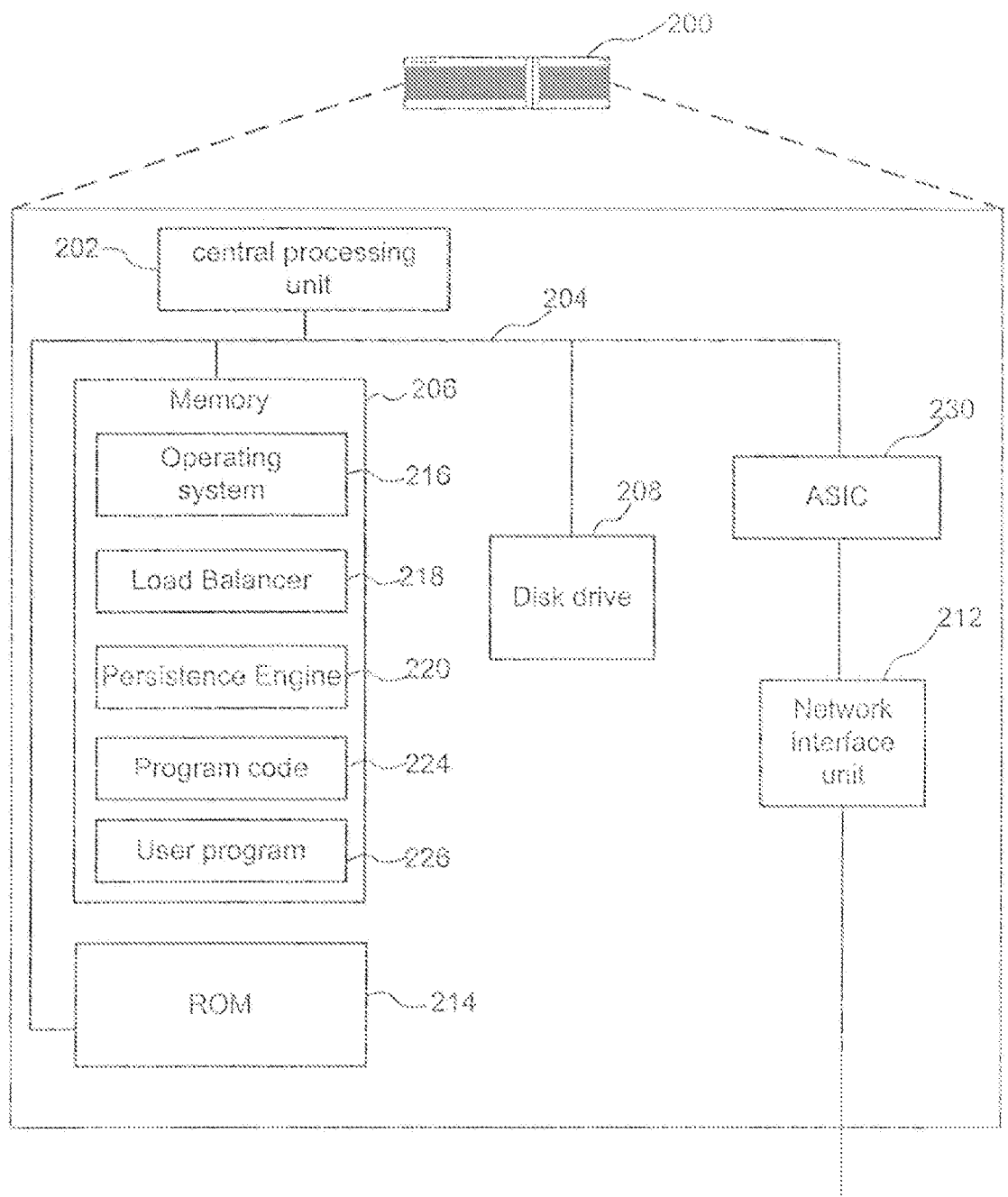
FIG. 2 is a block diagram of an exemplary network device that may be employed to perform the invention.

FIG. 2 shows an exemplary network device 200 that can operate as a traffic manager in accordance with an embodiment of the present invention. It will be appreciated that not all components of network device 200 are illustrated, and that network device 200 can include more or fewer components than those shown in FIG. 2. Network device 200 can operate, for example, as a router, bridge, firewall, gateway, distributor, load balancer, traffic manager, or proxy server. It is to be noted that these functions are not necessarily distinct from each other. For example, a traffic manager may perform load balancing and control an array of servers. The communications can take place over network 106 (FIG. 1), or some other communications network known to those skilled in the art.

As illustrated in FIG. 2, network device 200 includes a central processing unit (CPU) 202, mass memory, and a network interface unit 212 connected via a bus 204. Network interface unit 212 includes the necessary circuitry for connecting network device 200 to network 106, and is constructed for use with various communication protocols, including the TCP/IP protocol. Network interface unit 212 can include or interface with circuitry and components for transmitting messages and data over a wired and/or wireless communications medium.

The mass memory generally includes random access memory ("RAM") 206, read-only memory ("ROM") 214, and one or more permanent mass storage devices, such as hard disk drive 208. The mass memory stores operating system 216 for controlling the operation of network device 200. The operating system 216 may comprise an operating system such as UNIX®, LINUX®, or Windows®.

In one embodiment, the mass memory stores program code and data for implementing a load balancer 218, and program code and data for implementing a persistence engine 220. The mass memory can also store additional program code 224 and data for performing the functions of network device 200. The mass memory can further include one or more user programs 226 for controlling the network device 200. In particular, in accordance with one embodiment of the present invention, the user program 226 interacts with, provides data to, receives data from, and controls the load balancer 218 and the persistence engine 220, as described in further detail below.

In one embodiment, the network device 200 includes one or more Application Specific Integrated Circuit (ASIC) chips 230 connected to the bus 204. The ASIC chip 230 includes logic that performs some of the functions of network device 200. For example, in one embodiment, the ASIC chip 230 performs a number of packet processing functions, to process incoming packets. In one embodiment, the ASIC chip 230 includes the persistence engine 220, or a portion thereof. In one embodiment, the network device 200 includes one or more field-programmable gate arrays (FPGA) (not shown), instead of, or in addition to, the ASIC chip 230.

A number of functions of the network device can be performed by the ASIC chip 230, by an FPGA, by the CPU 202 with the logic of program code stored in mass memory, or by any combination of the ASIC chip, the FPGA, and the CPU.

In one embodiment, the network device 200 includes an SSL proxy (not shown) that performs cryptographic operations. In one embodiment, the SSL proxy is a separate network device from the traffic manager. In one embodiment, a separate network device performs the functions of the persistence engine 220.

Computer storage media can include volatile and nonvolatile, removable and non-removable media implemented in any method or technology for storage of information, such as computer readable instructions, data structures, program modules or other data. Examples of computer storage media include RAM 206, ROM 214, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device.

Network device 200 can also include an input/output interface (not shown) for communicating with external devices or users.

Network device 200 can be implemented as one or more "blades" where the term "blade" refers to one of multiple electronic circuit boards or cards that are installed in a hardware chassis with a backplane. An exemplary blade can include one or more processors, volatile and non-volatile memory, interfaces suitable for communicating information to and from the blade, and other components for enabling the operation of one or more applications. A blade can also include a specialized interface for the backplane and other interfaces, such as a USB port, FIREWIRE port, serial port, RF interface, IR interface, Ethernet interface, IDE controller, and the like. An application running on a blade can employ any of these interfaces to communicate information to other applications running on other blades and/or devices coupled to the blade server. Network device 200 can also be implemented as a combination of blades and additional components in chassis. In one embodiment, servers 112-116, of FIG. 1, are implemented as blades.

The traffic manager 110 shown in FIG. 1 typically includes one or more network interfaces, and performs one or more of the operations of routing, translating, and switching packets. A traffic manager having a single network connection is also within the scope of the present invention.

In one example of the invention, the traffic manager is a load-balancing traffic manager. In this example, the traffic manager includes load-balancing and control logic that can be implemented in software, hardware, or a combination of software and hardware.

The BIG-IP® Traffic Manager, by F5 Networks of Seattle, Wash., is a traffic manager that can be used to perform embodiments of the invention. Various functions of the BIG-IP Traffic Manager are disclosed in the BIG-IP Reference Guide, version 4.5.

In one embodiment, the traffic manager 110 intelligently distributes web site connections across the server array. The traffic manager 110 can manage connections to one or multiple Internet or intranet sites, and it can support a wide variety of Internet protocols and services such as TCP/IP (transmission control protocol/Internet protocol) and HTTP. Additionally, the traffic manager 110 can support any one or more of a suite of communications protocols that are used to connect nodes on the Internet, including HTTP, file transfer (FTP), secure sockets layer (SSL), streaming media, DNS, UDP/IP, and email (SMTP).

Referring to FIG. 1, each server 112-116 is identified by a unique identifier. The identifier can be a combination of a node address and a node port number on the intranet behind the traffic manager 110, which can monitor several aspects of the servers. The identifier can be a VLAN, or other identifier. The traffic manager 110 can load balance each connection to the intranet of servers by selecting a server to provide optimal access to a requested resource. To perform load balancing, the traffic manager 110 employs one or more algorithms for directing network traffic to a specific server. These algorithms include round robin, ratio, dynamic ratio, predictive, and least connections, and are explained in the BIG-IP Reference Guide cited above.

If a client 102-104 connects to one server 112-116 when requesting information, it may be desirable for the client to reconnect to that same server in a second request. This is desirable, for example, during an ecommerce transaction, when a server has stored data associated with the customer, and the data is not dynamically shared with the other servers. This is often the case when a customer uses a "shopping cart" at a web site server. During a second request, if the client is connected by the traffic manager to a second server, the second server might not have the information about the client and his shopping cart. In this situation, it is desirable that the traffic manager bypasses the load-balancing algorithm during the second request and directs the client to the prior server. This procedure is referred to as persistence.

In order to maintain persistence, a traffic manager uses a persistence key to associate incoming packets with corresponding target servers. In one embodiment, a traffic manager generates a persistence key based on data associated with incoming packets. A traffic manager may maintain a persistence table, which stores mappings between persistence keys and corresponding servers. After generating a persistence key, the traffic manager may look up the persistence key in the persistence table, in order to determine the corresponding target server.

Figure 3:
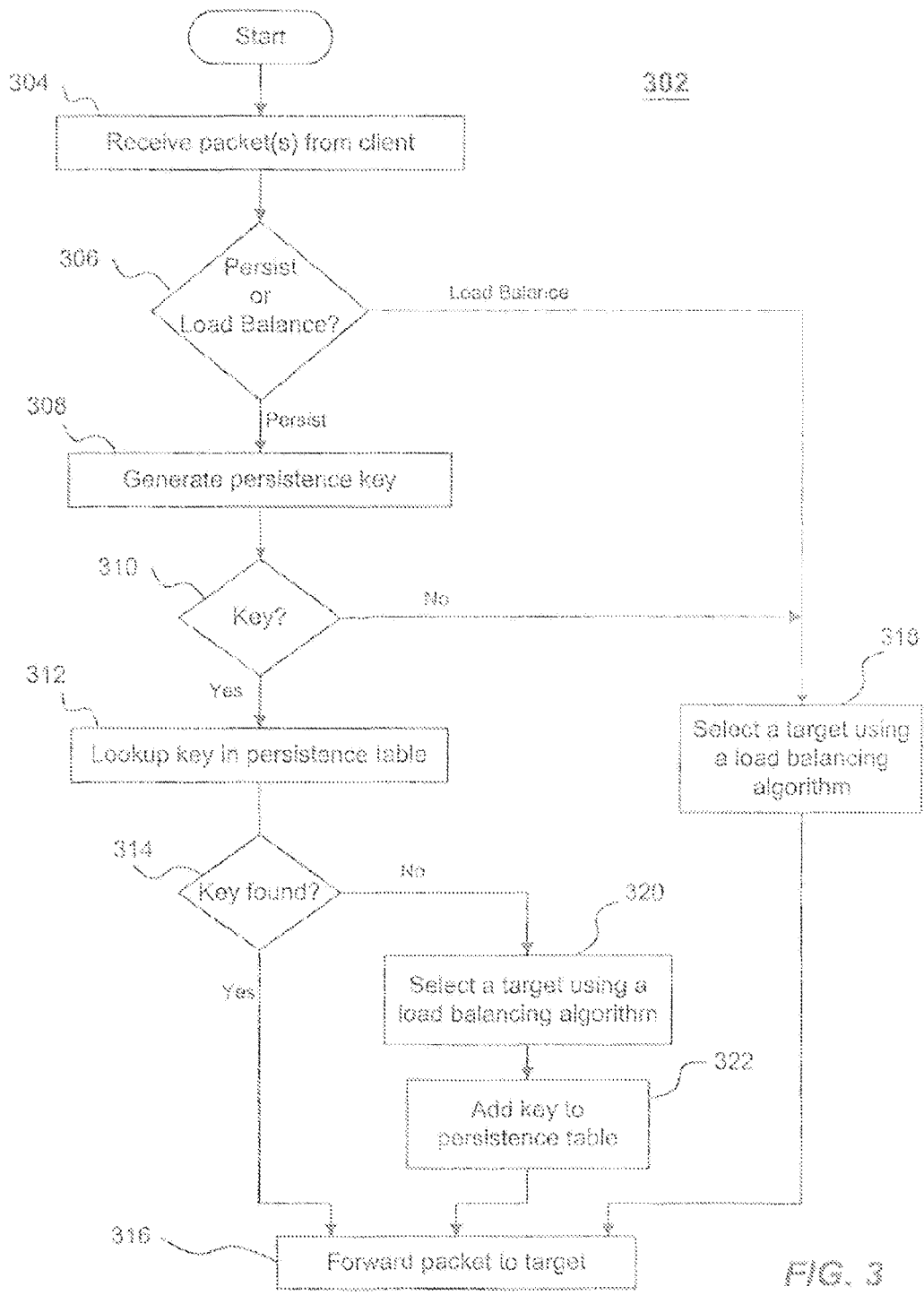
FIG. 3 is a flow chart illustrating a process for performing load balancing in accordance with an embodiment of the present invention.

FIG. 3 is a flow chart illustrating a process 302 of maintaining persistence, in accordance with one embodiment of the present invention. In one embodiment, the process 302 occurs within a traffic manager, such as the traffic manager 110 (FIG. 1). As shown in FIG. 3, after a start block, the process 302 proceeds to a block 304, where the traffic manager receives one or more packets from a client device, such as clients 102-104, in FIG. 1.

In one embodiment of the invention, the traffic manager can be configured to selectively perform a persistence operation, or to not perform persistence operations. When configured to not perform persistence operations, the load balancer selects targets based on a load balancing algorithm.

At a block 306, the process 302 makes a determination of whether to perform a load balancing operation with the incoming packets, or to perform a persistence operation. This determination is made based on the persistence configuration as described above. It is to be noted that when a determination to perform a persistence operation is made at the block 306, a subsequent determination, such as at block 310, might result in a load balancing operation being performed instead of persistence. If the process determines that it is to perform a persistence operation, the flow proceeds to a block 308. At the block 308, the process 302 generates a persistence key, using data within the received packets. The generation of a persistence key is discussed in more detail below. In some situations, the generation of a persistence key may fail to produce a key. At a block 310, the process determines whether a persistence key was successfully generated at the block 308. If a persistence key was generated, the flow proceeds to the block 312, where a lookup of the persistence key is performed on a persistence table. It is to be noted that the persistence table can include any of a number of data structures that map persistence keys to corresponding values that indicate a server. This can include a hash table or other type of database. The lookup can include determining whether a valid key/value exists for the generated persistence key.

In one embodiment, the process of looking up a key in the persistence table includes referring to a timestamp associated with the key, and determining whether a key/value mapping remains valid. If the mapping has timed out, it is treated in the same manner as not having a mapping at all, with respect to the process 302. In one embodiment, mappings that time out are removed from the persistence table.

At a decision block 314, a determination is made as to whether a valid mapping corresponding to the persistence key was found at the block 312. If a valid mapping was found, then flow proceeds to the block 316. At the block 316, the received packets are forwarded to a target corresponding to the mapping, based on the data in the mapping. In one embodiment, the data in the mapping is an identifier that directly identifies the target. In one embodiment, the data in the mapping is a value that can be used to determine the target.

As used herein, the term "target" can refer to one of a number of types of targets. For example, target can refer to a target server, such as one of target servers 112-116 in FIG. 1. Target can refer to a combination of target server and port number. Target can also include a reference to a pool of servers. Target can also include a reference to a particular application. For example, in one embodiment, target refers to a combination of {server, port, application}, and forwarding packets includes forwarding to a particular application employing a particular port on a server. In one embodiment, the targets are intermediate network devices, such as traffic managers.

If, at the decision block 306, a determination is made to perform load balancing, flow proceeds to the block 318. At the block 318, a target server is selected for the received packets based on a load balancing algorithm.

If, at the decision block 310, a determination is made that a persistence key was not found, flow proceeds to the block 318, and a load balancing operation is performed. At the block 316, the packet is forwarded to a target, based on the load balancing operation. In one embodiment, in response to receiving a packet, a target can generate a persistence key or a portion of a persistence key and transmit the key, or key portion, to the client. In a subsequent communication, the client then transmits the persistence key, or key portion, for use in maintaining persistence. A traffic manager can also generate a persistence key or a key portion and transmit it to a client. In one embodiment, a target selectively determines whether to transmit a persistence key, or key portion, to a client. The target can determine, for example, that persistence is not needed for some transactions, and that for other transactions, persistence is desired.

If, at the decision block 314, a determination is made that a valid mapping for the persistence key was not found, flow proceeds to a block 320, and a target is selected by using a load balancing algorithm. Additionally, if a valid mapping for the persistence key was not found at the decision block 314, at a block 322, a mapping of the key and the selected target is added to the persistence table. This allows the mapping to be found the next time the key is used. Flow then proceeds to the block 316, where the packet or packets are forwarded to the target.

It is to be noted that, in some embodiments, the actions of the process 302 may occur in different sequences, additional actions may be performed, or not all of the illustrated actions may be performed. For example, in one embodiment, after a target server to persist to is determined, a traffic manager receives additional packets from the client device prior to forwarding any of the client's packets to the target server. In one embodiment, one or more packets that are used for a persistence determination might not be forwarded to a target server, and the target server determination is used for additional packets from the same client. In one embodiment, data in the received packets is collected and modified, and forwarded to a target server in one or more packets. In one embodiment, the actions of blocks 308, 310, 312, and 314 are performed by a persistence engine, such as persistence engine 220 of FIG. 2; the actions of block 318 is performed by a load balancer module, such as load balancer module 218 of FIG. 2, and the remaining actions of the process 302 are performed by other modules of the traffic manager. In one embodiment, the actions of the process 302 are distributed in a different manner. In one embodiment, the persistence engine and load balancer are in a different device than the traffic manager, and exchange data with the traffic manager.

Referring again to FIG. 2, in accordance with an embodiment of the present invention, a user program, such as user program 226 includes user instructions relating to the generation of persistence keys. The user program interacts with one or more of the persistence engine 220, the load balancer 218, and the program code 224. As used herein, the term "core modules" refers to any one or more of the persistence engine, the load balancer, and the program code. The core modules can be implemented as software controlled by a processing unit, as hardware, such as an ASIC 230, or any combination thereof. The user program can be embodied in one or more of a number of different techniques for encoding instructions. In one technique, the user program comprises computer program code that is processed by a processor, such as central processing unit 202. The user program can interact with the core modules through the use of function calls, data variables, class invocations, or other techniques for program interaction and communication. In one technique, the user program comprises instructions that are interpreted by an interpreter. In one technique, the user program comprises one or more rules. The rules can be interpreted by an interpreter and interact with the core modules. In one technique, the core modules include an interpreter that interprets the instructions of the user program. In one technique, the user program comprises data or values, and the core modules include logic that understands the data and perform actions based on them. As used herein, the terms "user instructions" and "user program" can include one or more of program code, interpreted instructions, rules, data, and values that interact with and specify actions of the core modules.

The user program can include conditional instructions and flow control instructions that allow the user program to perform actions based on specified conditions. FIGS. 4A-D illustrate exemplary segments of a user program that controls the generation of a persistence key. FIGS. 4A.1 and 4A.2 illustrate two different codings of a user program segment that directs one of three actions to be performed, depending on the results of the conditional tests. This segment is discussed in more detail below.

FIG. 4B illustrates a reference to a symbolic variable, "http_cookie," that indirectly causes received data to be buffered. In one embodiment, a user program can access one or more symbolic variables. Some of the variables represent data that are available in an IP packet header. The following table illustrates a set of symbolic variables that are available to a user program and represent packet header data.

| Variable Name | Description |
| --- | --- |
| client_addr | Used by a client to represent a source IP address. This variable is replaced with an unmasked IP address. |
| server_addr | Used to represent a destination IP address. This variable is replaced with an unmasked IP address. The server_addr variable is used to represent the destination address of the packet. This variable is useful when load balancing traffic to a wildcard virtual server. |
| client_port | Used to represent a client port number. |
| server_port | Used to represent a server port number. |
| ip_protocol | Used to represent an IP protocol. This variable is replaced with a numeric value representing an IP protocol such as TCP, UDP, or IPSEC |
| link_qos | Used to represent the Quality of Service (QoS) level. |
| ip_tos | Used to represent that Type of Service (ToS) level. |

The following table illustrates a set of user instructions that are available to a user program in one embodiment of the invention. These instructions can be used to process layer 7 data in a buffered TCP stream, even if it is not part of an HTTP connection.

| Variable Name | Description |
| --- | --- |
| tcp_content | The tcp_content variable allows a user program to create a basic expression that load balances or persists on traffic based on arbitrary data within a TCP/IP connection. The variable returns TCP data content up to the traffic manager's maximum application buffer size. One use of the tcp_content variable is to search for specific strings when establishing a non-HTTP connection. |
| tcp_bytes_collected | The tcp_bytes_collected variable returns the amount of content that has currently been collected. |

In the exemplary user program code of FIG. 4C, the tcp_content variable and the tcp_content_collected variable are used to examine the contents of a TCP communication, and to determine whether additional buffering is desired. This can be used with a number of protocols that are layered on a TCP communication.

In one embodiment, a udp_content variable allows a user program to create a basic expression that load balances or persists on traffic based on arbitrary data within a UDP connection.

Some of the variables represent data that, is available within an HTTP request string. The latter are layer 7 data, and may require the buffering of multiple packets in order to identify the data. The following table illustrates a set of symbolic variables that are available to a user program and represent such HTTP data.

| Variable Name | Description |
| --- | --- |
| http_method | The http_method variable specifies the action of the HTTP request. Common values are GET or POST. |
| http_uri | The http_uri variable specifies the URL, but does not include the protocol and the fully qualified domain name (FQDN). For example, if the URL is http://www.uspto.gov/buy.asp, then the URI is /buy.asp. |
| http_version | The http_version variable specifies the HTTP protocol version string. Possible values are "HTTP/1.0" or "HTTP/1.1" |
| http_host | The http_host variable specifies the value in the Host: header of the HTTP request. It indicates the actual FQDN that the client requested. Possible values are a FQDN or a host IP address in dot notation. |
| http_cookie (<cookie_name>) | The HTTP cookie header variable specifies the value in the Cookie: header for the specified cookie name. An HTTP cookie header line can contain one or more cookie name value pairs. The http_cookie <cookie name> variable evaluates to the value of the cookie with the name <cookie name>. For example, given a request with the following cookie header line: Cookie: green-cookie = 4; blue-cookie = horses The variable http_cookie ("blue-cookie") evaluates to the string horses. The variable http_cookie ("green-cookie") evaluates to the string 4. |
| http_header (<header_tag_string>) | The http_header variable evaluates the string following an HTTP header tag that you specify. For example, you can specify the http_host variable with the http_header variable. In a rule specification, if you want to load balance based on the host name andrew, the rule statement might look as follows:<br>if ( http_header ("Host") starts_with "andrew" )<br>  { use pool andrew_pool }<br>else<br>  { use pool main_pool } |
| http_content [(<minlength>)] | The http_content variable evaluates the string following an HTTP content tag that you specify. For example, if you want to load balance traffic based on the value of the string date, the rule statement might look as follows:<br>if (findstr (http_content, "date=",5,6) == "052102" {<br>  use pool date_pool;<br>} else if (http_content_collected < 512)<br>  accumulate;<br>} else<br>  { use pool other_pool }<br>Note the following:<br>The http_content variable uses the content_length or transfer_encoding fields to determine the available content. If these headers cannot be found, the http_content variable simply returns the amount received and does not know if there is more data to be sent. |
| http_content_collected | The http_content_collected variable returns the amount of content that has currently been collected. |

In the exemplary user program code of FIG. 4B, the user instruction references the http_cookie symbolic variable. In processing this reference, the traffic manager might buffer more than one packet, in order to extract the data corresponding to the http cookie. In one embodiment, the number of packets that are buffered is restricted to the number of packets required to identify the referenced data.

In the exemplary user program code of FIG. 4A.1 and FIG. 4A.2, the http_content variable and the http_content_collected variable are used to examine the contents of an HTTP communication, and to determine whether additional buffering is desired.

FIG. 4D illustrates the combination of buffered data and single-packet data in the generation of a persistence key. In addition to the http_cookie symbolic variable illustrated in FIG. 4B, the exemplary user program code of FIG. 4D includes a reference to a client_addr symbolic variable and a client_port symbolic variable. These two symbolic variables correspond to data in a packet header, and therefore reside within a single packet. The http_cookie symbolic variable, as discussed above, corresponds to layer 7 data, and processing this data might include buffering more than one packet.

FIG. 4E illustrates a string search instruction that extracts a string from the received data, using a function that is provided in one embodiment of the invention. The illustrated function, findstr( ) Finds a string within another string, and returns the string starting at the offset specified from the match. In one embodiment, the following functions are available for use by user programs in extracting and manipulating data from received packets and in specifying a persistence key.

| | |
| --- | --- |
| substr( ) | Returns the string starting at the offset specified. |
| getfield( ) | Splits a string on a character, and returns the string corresponding to the specific field. |
| findclass( ) | Finds the member of a class that contains the result of the specified expression, and returns that class member. |
| decode_uri( ) | Evaluates the expression and returns a string with any %XX escape sequences decoded as per HTTP escape sequences defined in RFC2396 |
| domain( ) | Parses and returns up to the specified number of trailing parts of a domain name from the specified expression. |
| imid( ) | Parses the http_uri variable and user agent header |

-continued

| | |
|---|---|
| | for an i-mode ™ identifier string that can be used for i-mode persistence. This is used for i-mode compatible devices, such as wireless phones. |
| order( ) | Sorts two or more strings in a specified order and concatenates the results. Order can be ascending or descending. |

Figure 5:
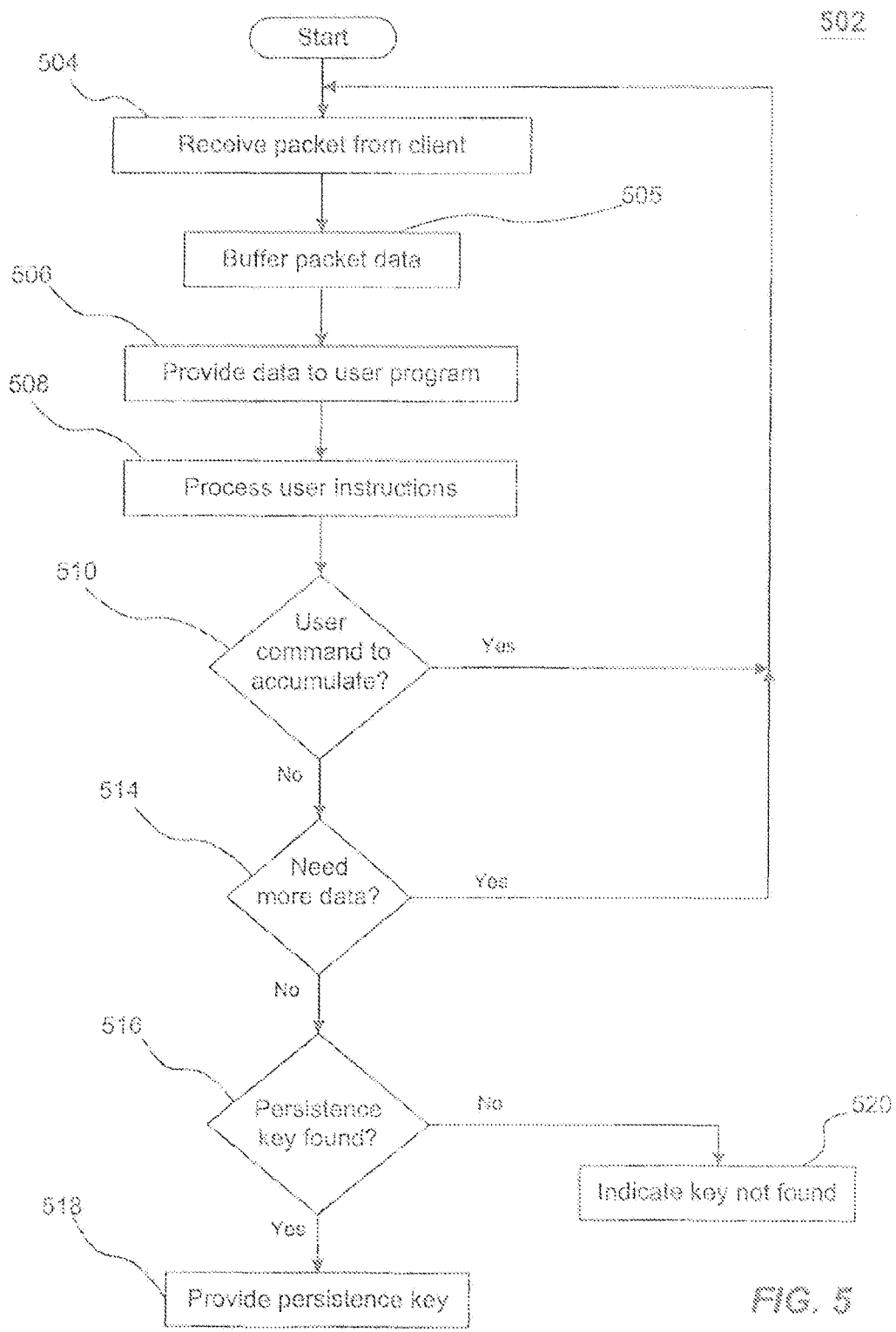
FIG. 5 is a flow chart illustrating a process for performing load balancing in accordance with one embodiment of the present invention.

FIG. 5 is a flow chart illustrating a process 502 of traffic manager core modules interacting with a user program to generate a persistence key. After a start block, flow proceeds to a block 504, where one or more packets are received from a client device. At a block 505, the received packet or packets are added to a buffer that maintains packet data received within the current communication. Buffering packets can include reconstructing packets in order to view data at the higher layers, such as layer 7. At a block 506, data is provided to the user program. This data can include data that was in one or more of the received packets, data that describes the received packet data, or other environmental data. For example, the persistence engine might provide a user program with a value that represents the amount of data received from a client during a communication. The type of data provided to user programs is described in further detail below.

At a block 508, one or more of the user instructions are processed. The user instructions can direct the operation of the core modules in a number of ways. This is discussed in further detail below. At a decision block 510, a determination is made as to whether a user instruction to accumulate additional data has been processed. An instruction to accumulate additional data instructs the traffic manager to buffer the packet data, and to process at least one more packet from the client, if available. FIG. 4A.1 and FIG. 4A.2 illustrate alternative exemplary segments of user instructions including an instruction to accumulate additional data. If an accumulate instruction has been processed, flow proceeds to the block 504, where a new packet is received from the client, if available.

If, at the decision block 510, it is determined that an accumulate instruction has not been processed, flow proceeds to the decision block 514. At the decision block 514, a determination is made as to whether additional data is needed, from additional packets. This decision is based on operations and user instructions other than an explicit accumulate instruction. For example, a user instruction might request a specific data item. If the data item has not yet been found, the persistence engine can automatically require additional data to be accumulated. Thus, the user instruction serves as an implicit instruction to accumulate additional data if the data is not yet available. FIG. 4B illustrates an instruction that accesses a symbolic variable, "http_cookie". This variable represents data within an HTTP cookie sent as part of an HTTP stream. If this data has not yet been received, the access to the variable serves as an implicit request to accumulate additional data. In another example, a previously processed user instruction can specify a minimum amount of data that is to be accumulated. This can be specified numerically or logically. For example, a user instruction can specify that at least 512 bytes of data be processed. Logical specification includes a specification of a test that indicates whether to continue accumulation. For example, a specification to continue accumulation until a designated string is found is a logical specification.

If the decision block 514 determines that additional data is needed, flow proceeds to the block 504, where a new packet is received. If no more data is needed at the decision block 514, the process 502 proceeds to the decision block 516, where a determination is made as to whether a persistence key, in accordance with the user program, has been found. If a persistence key has been found, at a block 518, the persistence key is provided. If a persistence key has not been found, then at a block 520 an indication that a key is not found is provided. Note that the decision block 516 corresponds to the decision block 310 in FIG. 3.

Buffering the received data, as represented by the block 505, might include extracting some or all of the data from the packets, processing it as required, and copying the data to a buffer, where it is saved at least until the processing is complete. The amount of data in the buffer increases as each new packet is received. Buffering can include logical buffering, where the data is not physically copied to a single buffer, and pointers or other values are maintained to allow inspection and processing of the collected packet data. In this manner, the buffer is a logical buffer, rather than a physical buffer. As used herein, the terms buffer and buffering include both logical and physical buffers.

Processing of the data can include one or more of several types of processing. The processing might include decrypting data that has previously been encrypted. For example, in a secure communication, such as SSL communication, the client might encrypt packets prior to transmitting them, and the traffic manager decrypts the packets after receiving them. The processing might include decompressing data that has previously been compressed. It might include discarding data that is not needed, or selectively extracting portions that are considered to be useful.

Secure communication protocols typically include a handshake protocol that includes one or more messages passed between two devices. In the SSL handshake, for example, messages are passed that include data such as a device identifier, a digital certificate, and encryption information. In one embodiment of the invention, processing the data includes extracting one or more data items that are received as part of a secure communication protocol handshake, and providing the data items to a user program to create a persistence key. A user program can use such a data item individually, or combine it with other data received either within a secure communication protocol handshake or outside of a secure communication protocol handshake.

Processing the data might also include decoding one or more portions of "chunked" data. Chunked encoding refers to formatting fragments of a message in discrete pieces, each piece accompanied by an indication of the size of the piece. Chunked encoding allows dynamically produced content to be transferred along with the information necessary for the recipient to verify that it has received the full message. The HTTP 1.1 protocol, cited above, describes one way to implement chunked encoding. In the HTTP 1.1 protocol implementation, a hexadecimal size field is prepended to the chunked data. Alternative implementations of chunked encoding are also possible, and corresponding techniques for decoding can be used with the invention.

The process of decoding chunked data includes reformatting multiple fragments of a chunked message in order to reform the original message. In one embodiment of the present invention, the amount of data that is decoded can be controlled by the user program instructions.

In one embodiment, processing the data also includes recognizing "lines" in the data. A line can be recognized by a delimiter comprising a carriage return, a linefeed, or both. A line can also be identified by the use of a table that includes an offset for the beginning of each line. This allows a user program to extract data based on its position within a line. For example, a user program can control a test as to whether a specified string occurs at the beginning of a line or at the end of a line. By identifying the beginning or ending of lines within the content, one embodiment of the present invention can perform such tests relative to a line. In one embodiment, a user program can extract data based on a position of a line containing the data within a message. For example, a user program might specify that a data item is to be extracted before or after a specified number of lines from the message beginning, before or after a specified number of lines from the message end, or before or after a specified number of lines following an identified position. In another example, a user program that controls buffering can specify a number of additional lines of content to accumulate, or a minimum or maximum number of lines to accumulate. In yet another example, a user program can identify a line within the data, and specify that a string is to be found in the line that immediately follows the identified line, or within a specified number of following lines. As used herein, the term message can refer to a single packet or to multiple packets of a communication.

In one embodiment, processing the data includes recognizing components within a markup language, such as the Extensible Markup Language (XML), Standard Generalized Markup Language (SGML), and similar languages. For example, the exemplary user program code of FIG. 4C can be used to extract data corresponding to a markup tag "XYZ" in XML or another markup language. In one embodiment, a user program can specify a markup language tag, and specify processing such as data extraction to be performed within the corresponding data, which might include nested tags and their data. The process 502 can parse the markup language data and recognize the ends of markup tags, in order to recognize the corresponding data.

The process 502 of generating a persistence key can include extracting multiple data items and combining them to generate a persistence key. Some data items are extracted from single packets. For example, a data item of a source IP address or a data item of server port is found in the TCP header of a single packet. Some data items are found in the buffered data, either because the data spans more than one packet, or because the data is not confined by a protocol to a specific packet. Items found in buffered data are items that are found at layers 6-7 of the OSI model. One example of this is a string found in an HTTP header. The particular string might be contained within a single packet, or might span two or more packets. In either case, the string is considered to be buffered data. In another example, an array of binary data within a TCP or UDP stream might be contained within a single packet, or might span two or more packets. Logically, however, it is considered to be part of the buffered data, because it is not structurally confined to a specific packet. The process of decoding chunked data can be performed as part of the process of buffering data.

This method of extracting and processing data allows an embodiment of the present invention to generate persistence keys from a combination of data items that include data items from both buffered data and single-packet data. As used herein, the term single-packet data does not require that the single-packet data is not buffered. The term describes data that is received within a single packet, and is known by the receiver to be within a single packet For example, a user program can specify that a source IP address and an HTTP header are to be combined to form a persistence key. The source IP address—a single-packet data item—and the HTTP header—a buffered data item—are combined to form the persistence key. Combinations of two or more data items from buffered and single-packet data can be generated in this manner. Typically, single-packet data is data that is found at layers 2 and 3 of the OSI model.

The method of extracting and processing data also allows alternative data items from single-packet and buffered data to be used. For example, a user program can specify that an HTTP header value (a buffered item) be used as a persistence key if it is found, and that if it is not found, the source IP address is to be used. This allows a user program to process and manipulate both buffered and single-packet data, with the details of the buffering handled by the core modules.

In one embodiment, some aspects of the invention are employed to provide persistence for two or more clients. In this embodiment, two or more clients, such as clients 102-104 (FIG. 1) communicate with one or more servers 112-116 through a traffic manager 110. The traffic manager 110 employs actions described above to extract a persistence key from packets received from a first client. The traffic manager 110 also employs actions described above to extract a second persistence key from packets received from a second client. The actions for extracting keys associated with each client might be the same actions, or they can be different actions. The extracted persistence keys associated with each client might be the same persistence key or they can be different persistence keys. The traffic manager uses the persistence keys to provide persistent communications between each client and a target device, such as server 112. This persistent communication can be used, for example, where each of the clients are communicating with the other clients, or where it is desired that each of the clients communicates with a common target. For example, in an environment where each of the clients is a participant in a game, a conversation, or another multi-party event, maintaining persistent communications with a common target can be desirable.

In one embodiment, the traffic manager or a server generates an identifier and transmits it to each of the clients. Each of the clients then includes the identifier in its packets, and the traffic manager extracts this identifier as a persistence key. HTTP cookies, HTTP headers, or XML data can be employed to pass the identifier from each of the clients. As an alternative, one or more of the clients can generate the identifier and transmit this identifier to each of the other clients in the communication.

When extracting persistence keys from packets received from multiple clients, in one embodiment, the persistence keys are equivalent. The traffic manager might, for example, look up a mapping between the persistence key and the target in order to identify the target. Referring to the actions of FIG. 3, the action of load balancing (described in block 320) can be performed when packets are received from the first client, and the key added to the persistence table (described in block 322). When packets are subsequently received from the second client, the persistence key is then found at the decision block 314, resulting in the packet being forwarded to the target at block 316. In one embodiment, the same sequence of actions, such as illustrated by user instructions in FIGS. 4A-E, are performed on packets received from both clients.

Figure 6:
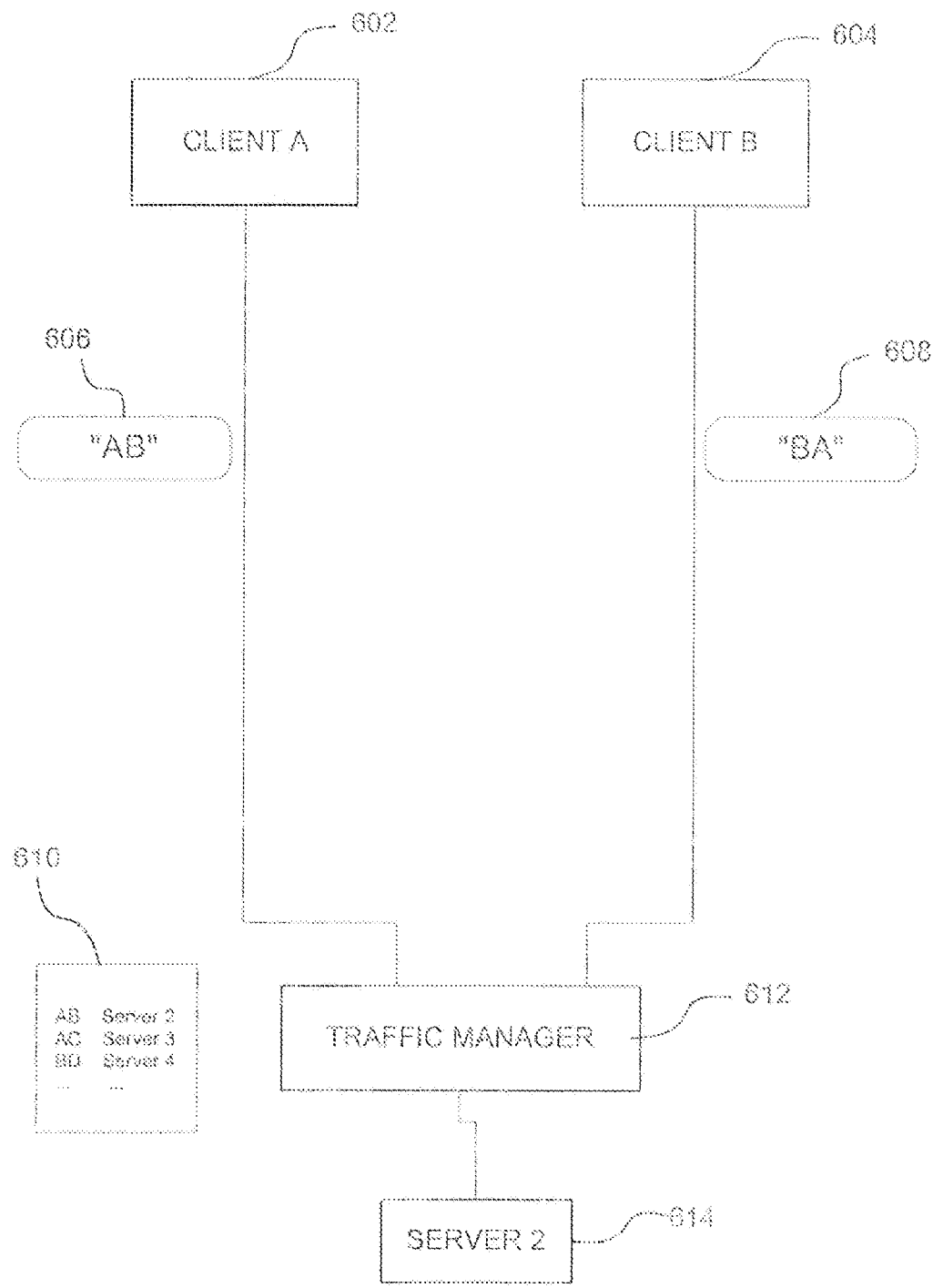
FIG. 6 is a system diagram of a computer network in which multiple clients are persisting to a target.

In one embodiment having two or more clients persisting to the same target, persistence keys extracted from each client may differ, and additional actions are taken to identify the target. FIG. 6 illustrates one example of this. As illustrated in FIG. 6, client A 602 includes its client identifier in a first position in a transmitted message 606, and the client identifier of client B 604 in a second position in the message 606. The traffic manager 612 extracts and combines, as a persistence key, both identifiers, or "AB" in the illustration. The traffic manager stores a mapping between the persistence key "AB"

and a selected server—server 2 (614) in FIG. 6—in a persistence table 610. Client B then transmits its client identifier in a first position and the client identifier of client A 602 in a second position in a message 608. The traffic manager then extracts and combines the identifiers to create a persistence key of "BA" and looks for a mapping between this key and a server in the persistence table 610. If the traffic manager does not find a mapping, it reverses the fields of the persistence key to obtain a second persistence key of "AB" and looks for this key in the persistence table 610. Finding this key in the table, the traffic manager knows to persist to server 2. This process can be expanded to configurations in which more than two clients desire to persist to a target. The mappings illustrated by the persistence table 610 can be implemented in a number of ways, including a hash table, an ordered table or list, a database, or other data structures.

An alternative way to implement persistence in the above configuration is as follows. When a client inserts its identifier and an identifier of a second client in a message, the client first sorts the identifiers in a specified order, for example, numeric order, or alphabetical order. In this way, the extracted persistence keys for each pair of clients will be identical, regardless of whether the message arrived from the first or the second client. This process can also be expanded to configurations in which more than two clients desire to persist to a target.

Yet another alternative is to have a user instruction to sort two extracted fields in a specified order when creating a persistence key. In this way, the traffic manager does the work of creating a persistence key that is identical regardless of which client it came from. In FIG. 6, for example, the persistence key will be "AB". This process can also be expanded to configurations in which more than two clients desire to persist to a target. In more generalized terms, the traffic manager can apply an ordering function on a set of two or more fields extracted from a message. An ordering function is defined as one in which the arguments are combined so that the result is independent of the order of the arguments to the function.

Figure 7:
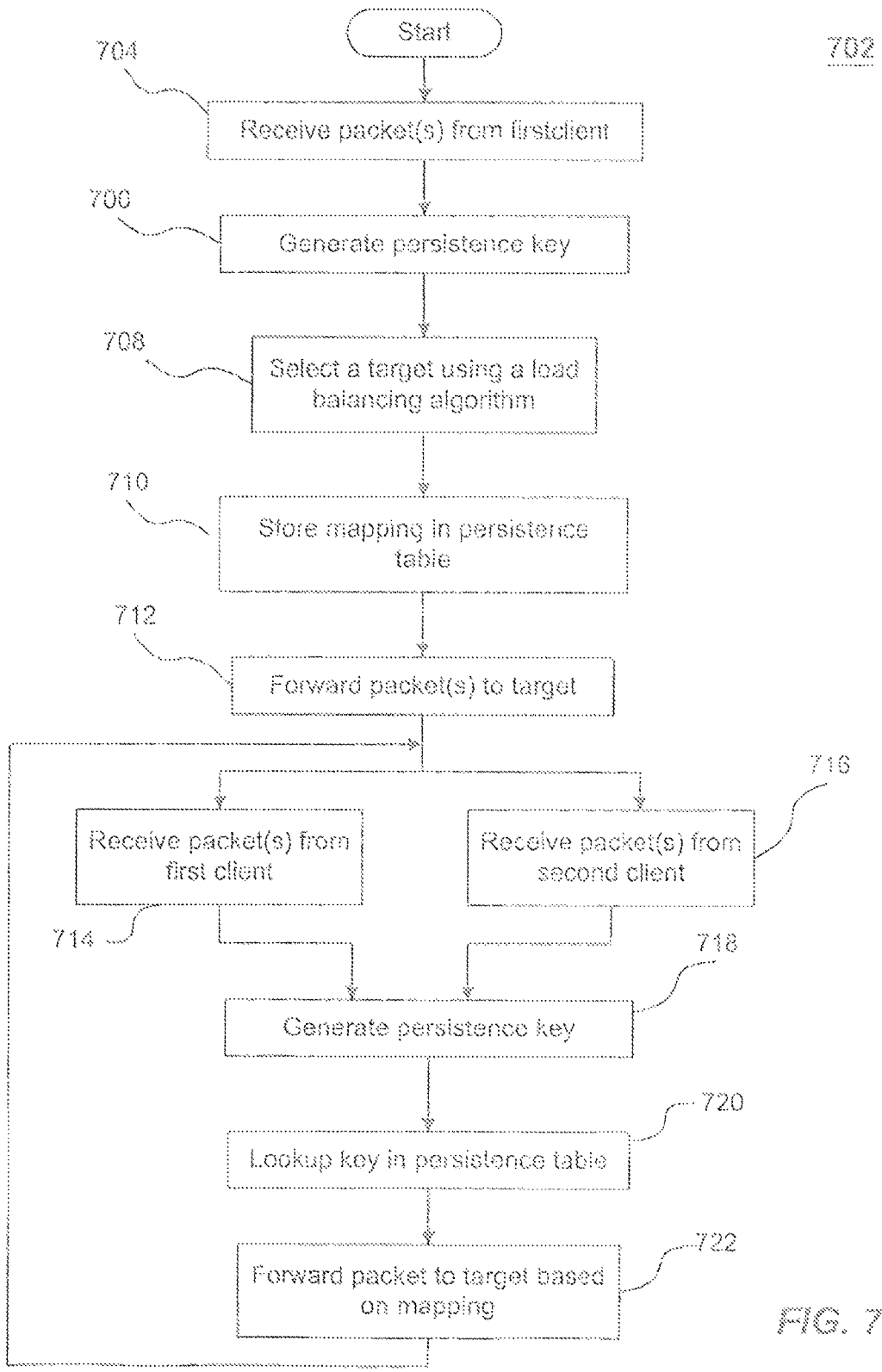
FIG. 7 is a flow chart illustrating a process for maintaining persistence between multiple clients and a target.

FIG. 7 illustrates a process 702 of maintaining persistence between multiple clients and a server. Some of the actions previously discussed are not illustrated, in order to simplify the illustration. After a start box, the process proceeds to a box 704, where a traffic manager receives a first packet or set of packets from a first client, such as Client A 602 of FIG. 6. At a box 706, the process generates a persistence key, using one or more of the mechanisms discussed for extracting and generating persistence keys. At a box 708, the process performs a load balancing algorithm in order to select a target, such as Server 2 (614) of FIG. 6. At a box 710, the process stores a mapping between the persistence key and the target in a persistence table. At a box 712, the process forwards the packet or packets to the target.

At boxes 714 or 716, a packet or packets are received from either the first client or a second client, such as Client B 604 of FIG. 6. At a box 718, a persistence key is generated by extracting data and optionally manipulating the data within the received packet or packets. At box 720, the process looks for the key in the persistence table. At a box 722, the process forwards the packet or packets to the target, based on the mapping found in the persistence table. The process then optionally continues by looping back to box 714 or 716, receiving one or more additional packets from either of the clients. This process can be extended to include additional clients.

As discussed above, but not illustrated in FIG. 7, if at the box 720, the persistence key is not found, the process might manipulate the fields of the persistence key to generate a second key, and search for the second key in the persistence table.

In another application employing some aspects of the invention, a client communicates though a traffic manager to a server using a tunnelling protocol. SOCKS is one such tunnelling protocol, in which TCP is tunnelled over TCP/IP. The client transmits packets that contain a TCP header, a SOCKS header, and data. As discussed above, the traffic manager can load balance a first packet from the client using a load balancing algorithm. When subsequent packets are received from the client, the load balancer extracts a persistence key from the packet. A persistence key can be extracted, for example, from one or more fields within the SOCKS header, or from any combination of fields in the SOCKS header, the TCP header, and the data. This allows the traffic manager to load balance and maintain persistence with packet traffic within a tunnelling protocol.

The above specification, examples and data provide a complete description of the manufacture and use of the composition of the invention. Since many embodiments of the invention can be made without departing from the spirit or scope of the invention, the invention resides in the claims hereinafter appended.

What is claimed is:

1. A network device for managing communications between client devices and a plurality of server devices, comprising:
   a memory device that stores executable instructions; and
   a central processing unit that executes the instructions to perform actions, including:
      receiving from a first client device a specified data item within a received application level communication and an other data item received as part of a secure communication protocol;
      employing the specified data item and the other data item to create a first persistence key useable to direct packets from the first client device to a target;
      receiving other packets from a second client device, the other packets including at least data about the first client device;
      combining data from the other packets, including the data about the first client device, to create a second persistence key;
      when a mapping between the second persistence key and an other target is not found, modifying fields within the second persistence key such that a mapping to the first persistence key is located; and
      using the mapping of the first persistence key to identify the target, such that packets received from the second client device are directed to the same target as the first client device.

2. The network device of claim 1, wherein the combined data from the other packets from the second client device includes an identifier of the second client device, and the data about the first client device includes an identifier of the first client device.

3. The network device of claim 1, wherein the second client device includes within the received other packets an identifier of the second client device and an identifier of the first client device in a specified order such that combining the data from the other packets creates the first persistence key that is useable to direct packets from the second client device to the same target as the first client device.

4. The network device of claim 1, wherein combining data from the other packets comprises extracting data about the first client device and data about the second client device, and arranging the extracted data in a specified order such to create the first persistence key that is useable to direct packets from the second client device to the same target as the first client device.

5. The network device of claim 1, wherein receiving from a first client device further comprises processing a plurality of packets from the first client device based on a set of user defined instructions, and buffering of a number of the plurality of packets, the number of packets based on the set of user defined instructions.

6. The network device of claim 1, wherein the first persistence key is created based in part on data about the second client device.

7. A non-transitory computer storage device having computer instructions stored thereon, the computer instructions arranged to perform actions, including:
   receiving from a first client device a specified data item received within an application level communication of a first plurality of packets, and an other data item received as part of a secure communication protocol;
   employing the specified data item and the other data item to create a first persistence key useable to direct packets from the first client device to a target;
   receiving other packets from a second client device, the other packets including at least data about the first client device;
   combining data from the other packets, including the data about the first client device, to selectively create the first persistence key; and
   when the first persistence key is created from the combined data, using the first persistence key to identify the target, such that packets received from the second client device are directed to the same target as the first client device.

8. The non-transitory computer storage device of claim 7, wherein combining data from the other packets comprises extracting data about the first client device and data about the second client device, and arranging the extracted data in a specified order to create the first persistence key.

9. The non-transitory computer storage device of claim 7, wherein the received other packets includes an identifier of the second client device and an identifier of the first client device in a specified order such that combining the data from the other packets creates the first persistence key.

10. The non-transitory computer storage device of claim 7, wherein to selectively create the first persistence key, further comprises:
   searching for the combined data in a persistence table; and
   when the combined data is not found in the persistence table, modifying the combined data and searching for the modified combined data in the persistence table.

11. The non-transitory computer storage device of claim 7, wherein the actions further comprising:
   when the first persistence key is not created from combined data, manipulating the combined data to match the first persistence key.

12. The non-transitory computer storage device of claim 7, wherein receiving from the first client device further comprising controlling an amount of buffering of the first plurality of packets.

13. The non-transitory computer storage device of claim 7, wherein the first persistence key is created based in part on data about the second client device.

14. A system, comprising:
   a plurality of targets useable to provide at least one response to a request; and
   a network device having memory and a processor arranged to perform actions, including:
      receiving from a first client device a specified data item received within a received application level communication of a first plurality of packets, and an other data item received as part of a secure communication protocol;
      employing the specified data item and the other data item to create a first persistence key useable to direct packets from the first client device to a target within the plurality of targets;
      receiving other packets from a second client device, the other packets including at least data about the first client device;
      combining data from the other packets, including the data about the first client device, to selectively create the first persistence key; and
      when the first persistence key is created from the combined data, using the first persistence key to identify the target, such that packets received from the second client device are directed to the same target as the first client device.

15. The system of claim 14, wherein combining data from the other packets comprises extracting data about the first client device and data about the second client device, and arranging the extracted data in a specified order to create the first persistence key.

16. The system of claim 14, wherein the received other packets includes an identifier of the second client device and an identifier of the first client device in a specified order such that combining the data from the other packets creates the first persistence key.

17. The system of claim 14, wherein to selectively create the first persistence key, further comprises:
   searching for the combined data in a persistence table; and
   when the combined data is not found in the persistence table, modifying the combined data and searching for the modified combined data in the persistence table.

18. The system of claim 14, wherein the network device performs actions further comprising:
   when the first persistence key is not created from combined data, manipulating the combined data to match the first persistence key.

19. The system of claim 14, wherein receiving from the first client device further comprising controlling an amount of buffering of the first plurality of packets.

20. The system of claim 14, wherein the network device performs actions further comprising:
   storing a mapping between the first persistence key and the target, such that the mapping is useable to determine when the first persistence key is created from the combined data based locating the first persistence key in the mapping using the combined data.

* * * * *

UNITED STATES PATENT AND TRADEMARK OFFICE
CERTIFICATE OF CORRECTION

PATENT NO. : 8,176,164 B1  
APPLICATION NO. : 13/300398  
DATED : May 8, 2012  
INVENTOR(S) : Richard Roderick Masters et al.

Page 1 of 1

It is certified that error appears in the above-identified patent and that said Letters Patent is hereby corrected as shown below:

On the Title Page, Item (56), under (Other Publications), line 3, delete "Preformance"" and insert -- Performance", --, therefor.

On Title Page 2, Item (56), line 49, under "Other Publications", delete "10/327,742" and insert -- 12/327,742 --, therefor.

On Title Page 2, Item (56), line 51, under "Other Publications", delete "10/327,742" and insert -- 12/327,742 --, therefor.

On Title Page 2, Item (56), line 53, under "Other Publications", delete "10/327,742" and insert -- 12/837,420 --, therefor.

On Title Page 2, Item (56), line 55, under "Other Publications", delete "10/327,742" and insert -- 12/837,420 --, therefor.

In drawing sheet 8 of 8, figure 7, in Box 704, line 1, delete "firstclient" and insert -- first client --, therefor.

In column 3, lines 7-17, delete "The set of .......... like." and insert the same on Col. 3, Line 6, after "106." as a continuation of the same paragraph.

In column 4, lines 44-47, delete "A number ....... CPU." and insert the same on Col. 4, Line 43, after "230." as a continuation of the same paragraph.

In column 8, line 44, delete "represent" and insert -- represent such --, therefor.

In column 9, line 24, delete "that," and insert -- that --, therefor.

Signed and Sealed this
Twelfth Day of February, 2013

Teresa Stanek Rea
*Acting Director of the United States Patent and Trademark Office*